United States Patent
Lu et al.

(10) Patent No.: US 11,261,092 B2
(45) Date of Patent: Mar. 1, 2022

(54) METHOD OF PRODUCING GRAPHENE

(71) Applicant: SOOCHOW UNIVERSITY, Suzhou (CN)

(72) Inventors: Qiang Lu, Suzhou (CN); Xiaoyi Zhang, Suzhou (CN); Liying Xiao, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 169 days.

(21) Appl. No.: 16/358,773

(22) Filed: Mar. 20, 2019

(65) Prior Publication Data
US 2019/0300371 A1    Oct. 3, 2019

(30) Foreign Application Priority Data

Mar. 28, 2018  (CN) .......................... 201810262140.4

(51) Int. Cl.
*C01B 32/192*    (2017.01)
*C01B 32/19*     (2017.01)

(52) U.S. Cl.
CPC ............ *C01B 32/192* (2017.08); *C01B 32/19* (2017.08); *C01B 2204/04* (2013.01); *C01B 2204/32* (2013.01); *C01P 2002/01* (2013.01); *C01P 2002/82* (2013.01); *C01P 2004/61* (2013.01); *C01P 2004/62* (2013.01); *C01P 2004/64* (2013.01)

(58) Field of Classification Search
CPC .............. C01B 32/192; C01B 2204/32; C01B 2204/04; C01P 2002/01; C01P 2004/62; C01P 2004/61; C01P 2004/64; C01P 2002/82

See application file for complete search history.

(56) References Cited

FOREIGN PATENT DOCUMENTS

| CN | 103173882 A | | 6/2013 |
|----|-------------|---|--------|
| CN | 104556021 A | * | 4/2015 |
| CN | 20160021673 A | | 2/2016 |
| CN | 105502371 A | | 4/2016 |

(Continued)

OTHER PUBLICATIONS

Zhuo, Hongmei, et al. "Sonication Exfoliation of Defect-Free Graphene in Aqueous Silk Nanofiber Solutions." ACS Sustainable Chemistry & Engineering 6.9 (2018): 12261-12267.*

(Continued)

*Primary Examiner* — Richard M Rump
(74) *Attorney, Agent, or Firm* — SZDC Law P.C.

(57) ABSTRACT

The invention provides a method of producing graphene. The method comprising: A) mixing graphite powders with a silk fibroin nanofiber solution, performing mechanical stirring to exfoliate graphite to form graphene flakes; wherein the silk fibroin nanofibers in the silk fibroin nanofiber solution have a crystallinity of 40% or above; the silk fibroin nanofibers have a diameter of 10 to 30 nm; the silk fibroin nanofibers have a length of 100 nm to 3 μm; the mechanical stirring has a shearing speed of 1,000 to 50,000 rpm; and the duration of the mechanical stirring is 10 min to 6 h; B) centrifuging the solution obtained in step A) after exfoliation to remove unexfoliated graphite; and C) centrifuging the centrifuged solution obtained in step B), and separating graphene from the silk fibroin nanofibers to obtain the graphene.

7 Claims, 3 Drawing Sheets

(56) References Cited

FOREIGN PATENT DOCUMENTS

| CN | 106698386 A | 5/2017 |
|---|---|---|
| CN | 106927457 A | 7/2017 |

OTHER PUBLICATIONS

Zhang, Xiaoyi, et al. "Mass production of biocompatible graphene using silk nanofibers." ACS applied materials & interfaces 10.27 (2018): 22924-22931.*

Lu, Qiang, et al. "Silk self-assembly mechanisms and control from thermodynamics to kinetics." Biomacromolecules 13.3 (2012): 826-832.*

Eswaraiah Varrla et al., "Turbulence-assisted shear exfoliation of graphene using household detergent and a kitchen blender" Nanoscale, 11810, 2014, 6, 11810-11819 (Aug. 15, 2014).

* cited by examiner

METHOD OF PRODUCING GRAPHENE

CROSS REFERENCE TO RELATED APPLICATIONS

This application claims the priority of Chinese Patent Application No. 201810262140.4, filed on Mar. 28, 2018, and the disclosures of which are hereby incorporated by reference.

FIELD

The present disclosure relates to the field of producing graphene nano materials, and in particular relates to a method of producing graphene.

BACKGROUND

Graphene has great potential application prospects in various fields such as batteries, electronic devices, optical devices, and biomedical applications due to its excellent mechanical properties, optical properties, electrical and thermal conductivity properties, and excellent biocompatibility. Using a mild method for large-scale production of high-quality graphene is the core and key to achieve the true realization of graphene applications.

At present, researchers have developed a variety of graphene production techniques, especially in the large-scale preparation, mainly including graphene oxide chemical exfoliation, electrochemical exfoliation, ultrasonic exfoliation, stabilizer grinding-assisted exfoliation and other methods. Chemically exfoliated graphene has a significant decrease in its comprehensive performance due to changes in functional groups, which greatly limits its practical application. Although methods such as grinding exfoliation have advantages in large-scale preparation, the layer number of graphene flake produced is too high, and the quality is greatly limited. Ultrasound-assisted exfoliation is conducted under mild conditions, and the graphene flakes produced have a low layer number and few defects, and can be directly prepared as a solvent dispersion system that can be further applied. However, it is difficult for ultrasonic exfoliation method to achieve large-scale production, and there are technical barriers which are not possible to be solved in large-scale preparation and application.

SUMMARY

An object of the present disclosure is to provide a method of producing graphene. The method of the present disclosure can achieve large-scale production while ensure the quality of the graphene flakes.

The present disclosure provides a method of producing graphene, comprising:

A) mixing graphite powders with a silk fibroin nanofiber solution, performing mechanical stirring to exfoliate graphite to form graphene flakes;

wherein the silk fibroin nanofibers in the silk fibroin nanofiber solution have a crystallinity of 40% or above; the silk fibroin nanofibers have a diameter of 10 to 30 nm; the silk fibroin nanofibers have a length of 100 nm to 3 μm;

the mechanical stirring has a shearing speed of 1,000 to 50,000 rpm; and the duration of the mechanical stirring is 10 min to 6 h;

B) centrifuging the solution obtained in step A) after exfoliation to remove unexfoliated graphite; and C) centrifuging the centrifuged solution obtained in step B), and separating graphene from the silk fibroin nanofibers to obtain the graphene.

Preferably, the mechanical stirring is performed at the temperature of 10 to 40° C.

Preferably, the device for the mechanical stirring has a volume of 1 L-100 L.

Preferably, the silk fibroin nanofibers have a beta-sheet crystal structure.

Preferably, the silk fibroin nanofiber solution has a mass concentration of 0.1-3%.

Preferably, the mass ratio of the dry silk fibroin nanofibers used to prepare the silk fibroin nanofiber solution to the graphite powders is 1: (1-100).

Preferably, the centrifuging in step B) is performed at the speed of 500-5,000 rpm; the duration of the centrifuging in step B) is 5 min to 2 h.

Preferably, the centrifuging in step C) is performed at the speed of 8,000-20,000 rpm; and the duration of the centrifuging in step C) is 5-60 min.

Preferably, the graphene has 5 layers or fewer and a lateral size of 100 nm-2 μm.

The present disclosure provides a method of producing graphene, comprising: A) mixing graphite powders with a silk fibroin nanofiber solution, performing mechanical stirring to exfoliate graphite to form graphene flakes; wherein the silk fibroin nanofibers in the silk fibroin nanofiber solution have a crystallinity of 40% or above; the silk fibroin nanofibers have a diameter of 10 to 30 nm; the silk fibroin nanofibers have a length of 100 nm to 3 μm; the mechanical stirring has a shearing speed of 1,000 to 50,000 rpm; and the duration of the mechanical stirring is 10 min to 6 h; B) centrifuging the solution obtained in step A) after exfoliation to remove unexfoliated graphite; and C) centrifuging the centrifuged solution obtained in step B), and separating graphene from the silk fibroin nanofibers to obtain the graphene. By exploring the stirring condition and optimizing the silk protein, the present disclosure realizes the production of high-quality graphene which can be dispersed in water or other water-organic solvent composite solvent under the condition of high-speed stirring treatment, obtaining high concentration and high yield of the graphene in aqueous solution (the highest concentration of 10 mg/ml or above and the highest yield of higher than 30%), which are significantly higher than that of the graphene prepared by high-speed stirring and exfoliation in the prior art.

BRIEF DESCRIPTION OF DRAWINGS

In order to more clearly illustrate the examples of the present disclosure or the technical solutions in the prior art, the drawings used in the examples or the prior art will be briefly described below. Obviously, the drawings in the following description are only the examples of the present application, and those skilled in the art can obtain other drawings according to the provided drawings without any creative work.

DETAILED DESCRIPTION

Figure 1:
FIG. 1 is a macroscopic view of the silk fibroin nanofibers used in Example 1.
Figure 2:
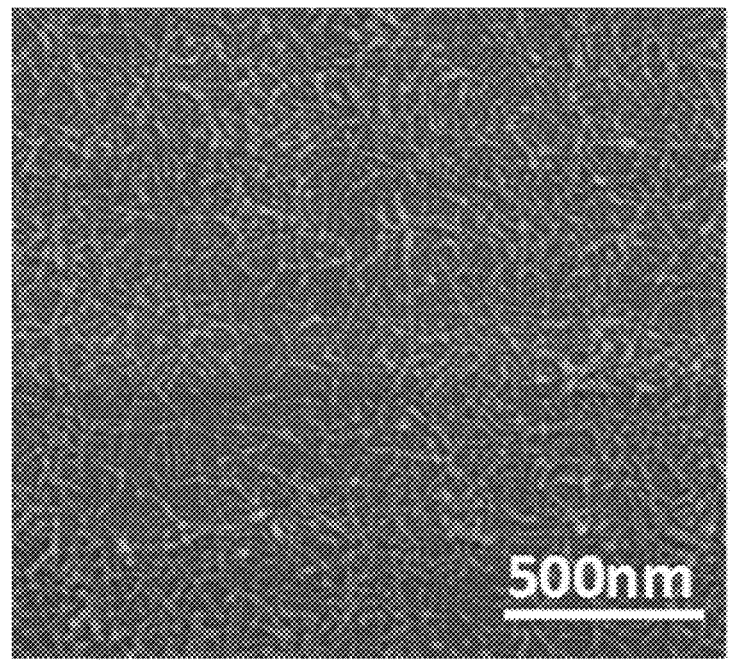
FIG. 2 is a scanning electron microscope image of the silk fibroin nanofibers used in Example 1.

The present disclosure provides a method of producing graphene, comprising:

A) mixing graphite powders with a silk fibroin nanofiber solution, performing mechanical stirring to exfoliate graphite to form graphene flakes;

wherein the silk fibroin nanofibers in the silk fibroin nanofiber solution have a crystallinity of 40% or above; the silk fibroin nanofibers have a diameter of 10 to 30 nm; the silk fibroin nanofibers have a length of 100 nm to 3 μm;

the mechanical stirring has a shearing speed of 1,000 to 50,000 rpm; and the duration of the mechanical stirring is 10 min to 6 h;

B) centrifuging the solution obtained in step A) after exfoliation to remove unexfoliated graphite; and C) centrifuging the centrifuged solution obtained in step B), and separating graphene from the silk fibroin nanofibers to obtain the graphene.

In the present disclosure, the graphite powders is mixed with a silk fibroin nanofiber solution and subjected to mechanically stirring; and the graphite is exfoliated to form graphite flakes.

In the present disclosure, the silk fibroin nanofiber solution comprises silk fibroin nanofibers and a solvent. The silk fibroin nanofibers are highly crystalline nanofibers, which have a beta-sheet crystal structure and a crystallinity of 40% or above. The diameters of the silk fibroin nanofibers are preferably 10-30 nm, more preferably 15-25 nm, and most preferably 20-22 nm; the lengths of the silk fibroin nanofibers are preferably 100 nm-3 μm, more preferably 500 nm-2.5 μm, and most preferably 1-2 μm.

In the present disclosure, the silk fibroin nanofibers are preferably prepared according to the following steps:

concentrating a silk fibroin aqueous solution at 40-60° C. to obtain a first silk-protein solution having a concentration of 6-12 wt %;

concentrating the first silk-protein solution at 20-35° C. to obtain a second silk-protein solution having a concentration of 18-24 wt %;

diluting the second silk-protein solution with water to a silk-protein solution having a concentration of 0.1-2 wt %, sealing and incubating at 50-70° C. to obtain a highly crystalline silk fibroin nanofiber solution.

The special block structure of the silk-protein gives it a certain hydrophobicity, so that it can be stably combined with graphene. It is theoretically expected that the silk-protein can be applied in the preparation of graphene materials. However, the ordinary silk-protein solution is also unstable, and it is easy to convert into a gel during the stirring process, resulting in the failure of exfoliation. Stable highly crystalline silk-protein is hardly soluble in water and cannot be used in an aqueous solution. Therefore, it has not been reported to exfoliate graphene via silk-protein in an aqueous solution system. In our study, by adjusting the assembly of silk-protein, highly crystalline silk fibroin nanofibers are obtained, which have more negative charge on their surface, so that they can be dispersed in water or other organic solvents miscible with water. The obtained silk fibroin nanofibers avoid the defects of traditional silk-protein and are expected to be used as a stabilizer and dispersant to achieve the exfoliation and preparation of graphene.

The solvent is preferably water or a water-miscible water-organic solvent composite solvent.

The silk fibroin nanofiber solution preferably has a mass concentration of 0.1-3%, more preferably 0.5-2.5%, and most preferably 1-2.

The mass ratio of the silk fibroin nanofibers to the graphite powders is preferably 1: (1-100), more preferably 1: (10-80), and most preferably 1: (20-60).

In the present disclosure, the shearing speed of the mechanical stirring is preferably 1,000-50,000 rpm, more preferably 10,000-50,000 rpm, and most preferably 20,000-40,000 rpm, and specifically can be 10,000 rpm, 20,000 rpm or 50,000 rpm. The duration of the mechanical stirring is preferably 10 min-6 h, more preferably 1-4 h, and most preferably 2-3 h, and specifically can be 1 h, 2 h, or 4 h. The temperature of the mechanical stirring is preferably 10-40° C., more preferably 15-35° C., and most preferably 20-30° C. The mechanical stirring is preferably carried out by a high-speed stirring pulverizer, wherein the device for the mechanical stirring preferably has a volume of 1 L-100 L, and more preferably 1 L-10 L.

After the above mechanical stirring and exfoliating, the obtained solution is centrifuged to remove unexfoliated graphite.

The speed of the centrifugation is preferably 500-5,000 rpm, more preferably 1,000-4,000 rpm, and most preferably 2,000-3,000 rpm; and the duration of the centrifugation is preferably 5 min-2 h, more preferably 20-60 min, and most preferably 40-60 min.

Then, the solution obtained by centrifugation is centrifuged again to separate the silk fibroin nanofibers from graphene to obtain graphene.

In the present disclosure, the speed of the centrifugation is preferably 8,000-20,000 rpm, more preferably 8,000-15,000 rpm, and most preferably 10,000-15,000 rpm; and the duration of the centrifugation is preferably 5-60 minutes, more preferably 10-40 minutes, most preferably 20-30 min.

The present disclosure provides a method of producing graphene, comprising: A) mixing graphite powders with a silk fibroin nanofiber solution, performing mechanical stirring to exfoliate graphite to form graphene flakes; wherein the silk fibroin nanofibers in the silk fibroin nanofiber solution have a crystallinity of 40% or above; the silk fibroin nanofibers have a diameter of 10 to 30 nm; the silk fibroin nanofibers have a length of 100 nm to 3 μm; the mechanical stirring has a shearing speed of 1,000 to 50,000 rpm; and the duration of the mechanical stirring is 10 min to 6 h; B) centrifuging the solution obtained in step A) after exfoliation to remove unexfoliated graphite; and C) centrifuging the centrifuged solution obtained in step B), and separating graphene from the silk fibroin nanofibers to obtain the graphene.

Compared with the prior art, the present disclosure has the following advantages:

(1) the selection of silk-protein with specific conformation and nanostructure enables highly crystalline silk-protein to be dispersed in water or other solvents, while avoiding the negative influence of high-speed stirring on the conformation of silk-protein, and finally achieving the preparation of high-quality graphene which can be dispersed in water or other water-organic solvent composite solvent under the condition of high-speed stirring treatment by using silk-protein as the stabilizer and dispersant;

(2) by adjusting the ratio of the silk fibroin to the added graphite, stirring speed, duration, temperature, stirrer volume and centrifugation speed, high concentration and high yield of the graphene in aqueous solution can be obtained, the highest concentration reaching 10 mg/ml or above, and the highest yield being higher than 30%, both of which are significantly higher than that of the graphene prepared by high-speed stirring and exfoliation in the prior art;

(3) by optimizing the centrifugation speed, the separation of silk-protein from graphene can be further achieved, so as to obtain high-purity graphene, avoiding the influence of silk-protein on the performance of graphene in certain applications, and providing more choice and advantage for the efficient application of graphene materials;

(4) compared with the conventional graphene, the graphene produced in the present disclosure has low number of layers, few defects, and has a high concentration and yield in water, having the prospect of large-scale preparation and application;

(5) the method uses water or a water-miscible composite solvent as a solvent, so the process is simple, and the obtained product has good biocompatibility and is easy to scale up.

In order to further illustrate the present disclosure, the method of producing graphene provided in the present disclosure will be described in detail below with reference to the examples, but it should not be construed as limiting the scope of the invention.

Example 1

(1) 10 g of graphite powder was mixed with 500 ml of 0.5% silk fibroin nanofibers aqueous solution;
(2) the mixed solution was processed by a high-speed pulverizer at 10,000 rpm for 1 h, so that the graphite was exfoliated to form graphene flakes;
(3) the post-processed solution was centrifuged at 800 rpm for 40 min to remove unexfoliated graphite, so as to obtain a graphene solution stabilized by silk fibroin nanofibers in the upper layer;
(4) the graphene solution was further centrifuged at 10,000 rpm for 10 min to separate the graphene from the silk fibroin nanofibers, so as to obtain high-purity graphene material in the lower layer.

Figure 3:
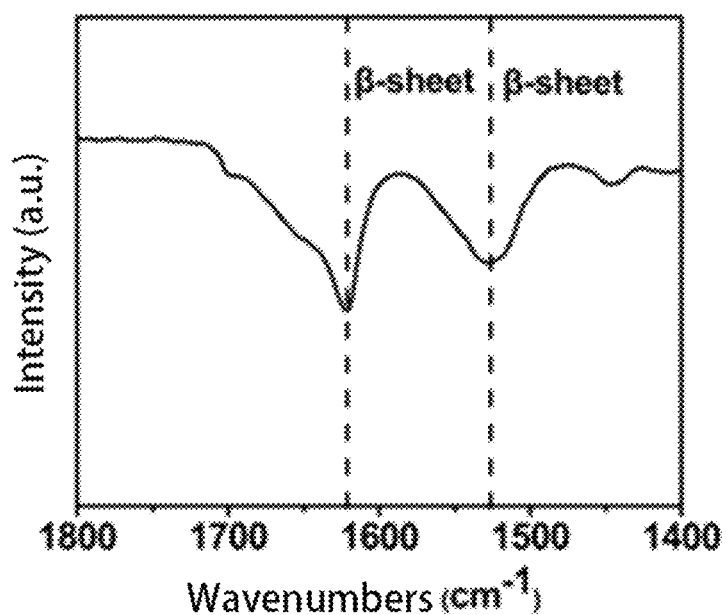
FIG. 3 is an infrared spectrum diagram of the silk fibroin nanofibers used in the present disclosure.
Figure 4:
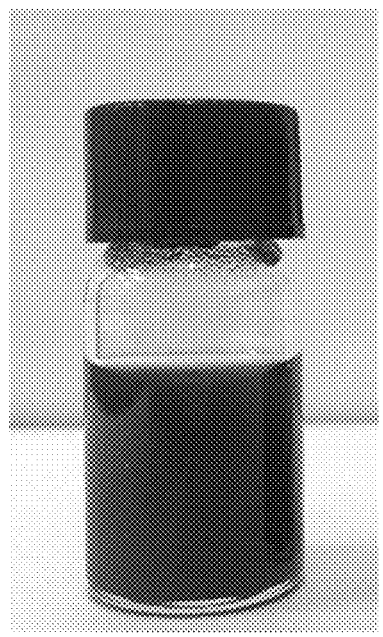
FIG. 4 is a macroscopic view of the graphene prepared in Example 1 of the present application.
Figure 5:
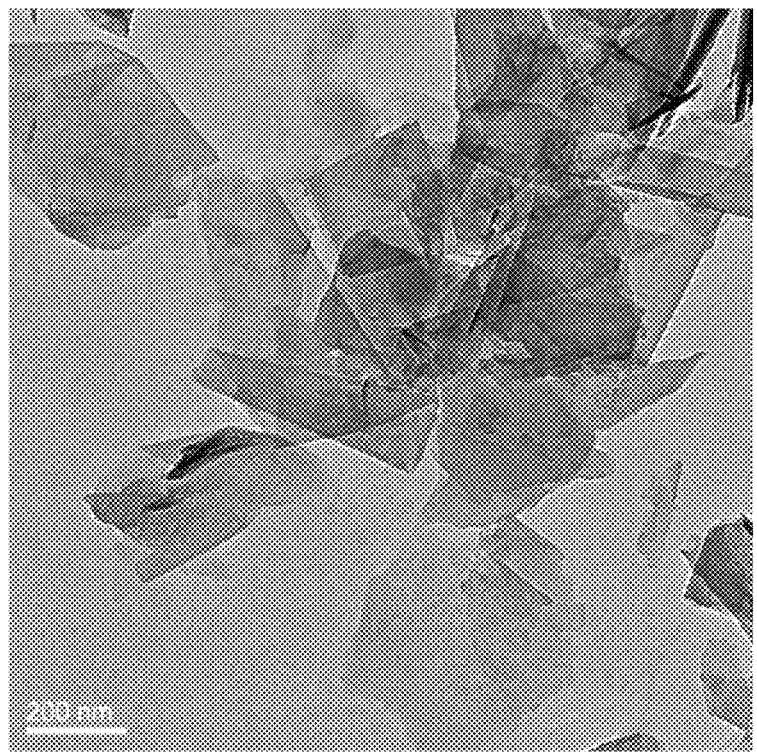
FIG. 5 is a transmission electron microscope image of the graphene prepared in Example 1.
Figure 6:
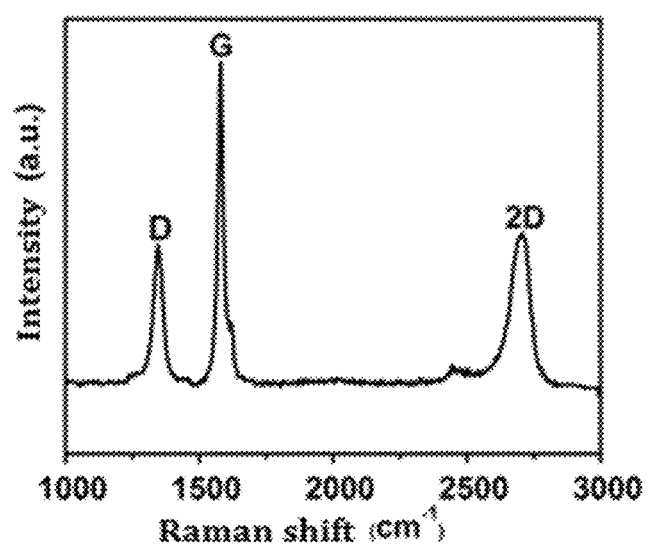
FIG. 6 is a Raman spectrum of the graphene prepared in the present disclosure.

Referring to FIGS. 1 to 6, FIG. 1 and FIG. 2 are macroscopic and microscopic views of the silk fibroin nanofibers used as stabilizer and dispersant in the example. FIG. 3 is an infrared spectrum diagram of the nanofibers, from which it can be seen that the silk fibroin nanofibers can maintain in a solution state, the diameter of the fibers is between 10 and 30 nanometers, and the length of the fibers is between 100 nanometers and 3 micrometers, indicating that the conformation is mainly a beta-sheet crystal structure. FIG. 4 and FIG. 5 are macroscopic view and transmission electron microscope image of the graphene obtained in the example, from which it can be seen that the layer number of the graphene is 5 or less, and the lateral size is between 100 nm and 2 μm. FIG. 6 is a Raman spectrum, from which it can be seen that the graphene has few defects and high quality.

Example 2

(1) 10 g of graphite powder was mixed with 500 ml of 1% silk fibroin nanofibers water-ethanol solution;
(2) the mixed solution was processed by a high-speed pulverizer at 10,000 rpm for 1 h, so that the graphite was exfoliated to form graphene flakes;
(3) the post-processed solution was centrifuged at 1,000 rpm for 20 min to remove unexfoliated graphite, so as to obtain a graphene solution stabilized by silk fibroin nanofibers in the upper layer;
(4) the graphene solution was further centrifuged at 10,000 rpm for 20 min to separate the graphene from the silk fibroin nanofibers, so as to obtain high-purity graphene material in the lower layer.

Example 3

(1) 20 g of graphite powder was mixed with 1 L of 2% silk fibroin nanofibers aqueous solution;
(2) the mixed solution was processed by a high-speed pulverizer at 50,000 rpm for 2 h, so that the graphite was exfoliated to form graphene flakes;
(3) the post-processed solution was centrifuged at 500 rpm for 60 min to remove unexfoliated graphite, so as to obtain a graphene solution stabilized by silk fibroin nanofibers in the upper layer;
(4) the graphene solution was further centrifuged at 8,000 rpm for 30 min to separate the graphene from the silk fibroin nanofibers, so as to obtain high-purity graphene material in the lower layer.

Example 4

(1) 20 g of graphite powder was mixed with 500 ml of 1.5% silk fibroin nanofiber solution;
(2) the mixed solution was processed by a high-speed pulverizer at 20,000 rpm for 2 h, so that the graphite was exfoliated to form graphene flakes;
(3) the post-processed solution was centrifuged at 800 rpm for 40 min to remove unexfoliated graphite, so as to obtain a graphene solution stabilized by silk fibroin nanofibers in the upper layer;
(4) the graphene solution was further centrifuged at 10,000 rpm for 10 min to separate the graphene from the silk fibroin nanofibers, so as to obtain high-purity graphene material in the lower layer.

Example 5

(1) 20 g of graphite powder was mixed with 500 ml of 2% silk fibroin nanofiber solution;
(2) the mixed solution was processed by a high-speed pulverizer at 10,000 rpm for 4 h, so that the graphite was exfoliated to form graphene flakes;
(3) the post-processed solution was centrifuged at 4,000 rpm for 30 min to remove unexfoliated graphite, so as to obtain a graphene solution stabilized by silk fibroin nanofibers in the upper layer;
(4) the graphene solution was further centrifuged at 15,000 rpm for 20 min to separate the graphene from the silk fibroin nanofibers, so as to obtain high-purity graphene material in the lower layer.

The above is merely preferred embodiments of the present disclosure. It should be noted that one of ordinary skill in the art can also make several improvements and modifications without departing from the principles of the present disclosure. These improvements and modifications should also be regarded as the scope of protection of the present disclosure.

What is claimed is:
1. A method of producing graphene, comprising:
A) mixing graphite powders with a silk fibroin nanofiber solution, performing mechanical stirring to exfoliate graphite to form graphene flakes;
wherein the silk fibroin nanofibers in the silk fibroin nanofiber solution have a crystallinity of 40% or above;

the silk fibroin nanofibers have a diameter of 10 to 30 nm; the silk fibroin nanofibers have a length of 100 nm to 3 µm;

wherein the mechanical stirring has a shearing speed of 20,000 to 50,000 rpm; and the duration of the mechanical stirring is 10 min to 6 h; and wherein the mechanical stirring is performed at the temperature of 10 to 40° C. and in a device with a volume of 1 to 100 L;

B) centrifuging the solution obtained in step A) after exfoliation to remove unexfoliated graphite; and C) centrifuging the centrifuged solution obtained in step B), and separating graphene from the silk fibroin nanofibers to obtain the graphene.

2. The method according to claim 1, wherein the silk fibroin nanofibers has a beta-sheet crystal structure.

3. The method according to claim 1, wherein the silk fibroin nanofiber solution has a mass concentration of 0.1 to 3%.

4. The method according to claim 1, wherein the mass ratio of the dry silk fibroin nanofibers used to prepare the silk fibroin nanofiber solution to the graphite powders is 1: (1 to 100).

5. The method according to claim 1, wherein the centrifuging in step B) is performed at the speed of 500 to 5,000 rpm; and the duration of the centrifuging in step B) is 5 min to 2 h.

6. The method according to claim 1, wherein the centrifuging in step C) is performed at the speed of 8,000 to 20,000 rpm; and the duration of the centrifuging in step C) is 5 to 60 min.

7. The method according to claim 1, wherein the graphene has 5 layers or fewer and a lateral size of 100 nm to 2 µm.

* * * * *